March 14, 1944.

P. W. CRANE ET AL 2,343,887

APPARATUS FOR CUTTING TAPERED FILAMENTS

Filed Nov. 25, 1942

Paul W. Crane
Reuben T. Fields
INVENTORS

BY

ATTORNEY

March 14, 1944.    P. W. CRANE ET AL    2,343,887
APPARATUS FOR CUTTING TAPERED FILAMENTS
Filed Nov. 25, 1942    2 Sheets-Sheet 2
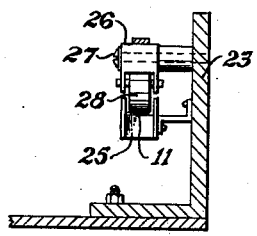
Fig. 3
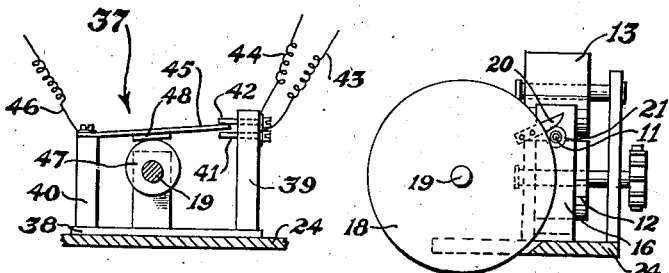
Fig. 4    Fig. 5
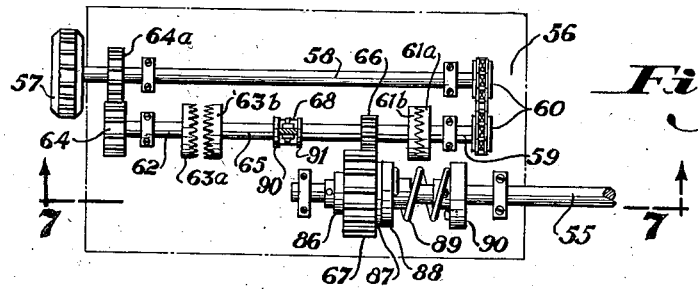
Fig. 6
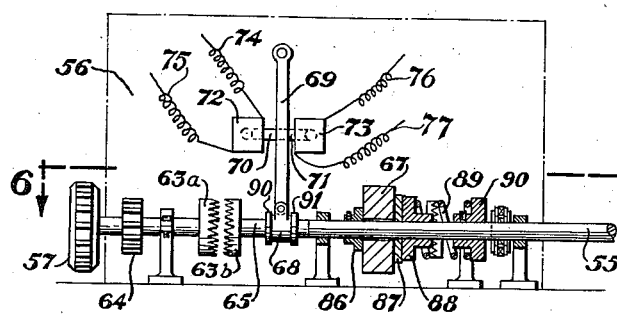
Fig. 7
Fig. 8
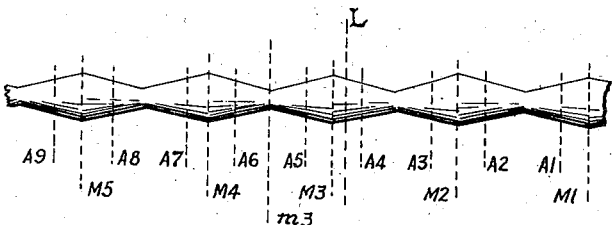
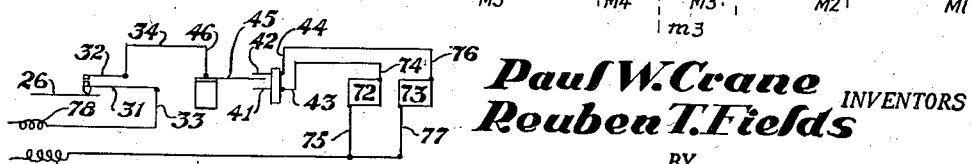
Fig. 9
Paul W. Crane
Reuben T. Fields
INVENTORS
BY
J. W. Cashley
ATTORNEY Patented Mar. 14, 1944

2,343,887

UNITED STATES PATENT OFFICE 2,343,887

APPARATUS FOR CUTTING TAPERED FILAMENTS

Paul W. Crane, Montclair, and Reuben T. Fields, Arlington, N. J., assignors to E. I. du Pont de Nemours & Company, Wilmington, Del., a corporation of Delaware Application November 25, 1942, Serial No. 466,966

12 Claims. (Cl. 164—68)

This invention relates to an apparatus for cutting tapered filaments and, more particularly, to cutting a filament composed of a series of tapered sections into units of substantially identical length and shape.

In describing the present invention frequent reference will be made to tapered filaments of synthetic linear polymers because tapered filaments of these substances are of particular commercial interest but it will be apparent that the invention is applicable to tapered filaments in general regardless of their particular composition.

Tapered filaments of synthetic linear polymers are of value in the manufacture of paint brushes and the like, to replace natural bristle, and in the manufacture of fishing lines and leaders, in which they replace braided textile fibers, silk worm gut, and the like. Inasmuch as the difficulties of cutting tapered filaments to make bristles for brushes are greater than in the case of fishing leaders, where each individual unit is relatively of much greater length, the invention will be described with particular reference to tapered filaments of the former type.

Continuous tapered filament, composed of a series of tapered sections, must be cut up into individual pieces for use. In the case of fishing lines and leaders, in which the length of the unit is considerable and in which it is not essential that the filament be cut with great exactitude at the points of smallest and largest diameters, the problem of cutting into lengths is relatively simple, and the cutting may be done with shears or other simple manual equipment by a reasonably trained operator.

But the cutting into lengths of tapered filament for use in brushes is not readily or economically accomplished by such methods. Since the lengths of the individual tapered sections of filament for this use may be as short as a couple of inches, and seldom longer than about a foot, the number of cuts per pound of material is very large and cutting by manual means, even if it gave satisfactory results, would be prohibitively expensive. Actually, cutting by such methods does not give satisfactory results. If it is left to the operator to determine visually the points of maximum and minimum diameter, at one or both of which the cut must be made, inaccurate cutting is bound to result, since the exact locations of these points cannot be found by simple inspection. If, one the other hand, one point of minimum or maximum diameter be carefully determined as a starting point, and the subsequent cuts be located on the assumption of exact regularity in length of successive units, the result is satisfactory only if the assumption is valid. If the length of the unit deviates, for any reason, from the assumed value, the cut will be mislocated. Inaccuracies, from whatever source, in the cutting of these short lengths are of serious consequence; either the pieces of inaccurate cut will be unacceptable for use, and must be scrapped, or else they must be trimmed at one end or the other, or both, with cost in labor and material, in order to make them acceptable as of a shorter length.

In the present specification, points of maximum and minimum diameter will be referred to, for sake of brevity, respectively as "maximum-" and "minimum-points." In filaments in which the tapered sections are separated by untapered sections of maximum or minimum diameter, the maximum- (or minimum-) point is the point midway in the length of such untapered section of maximum (or minimum) diameter. The distance between successive maximum-points, or between successive minimum-points, is designated the "unit length" of the tapered filament.

Further, with respect to the configuration of the filament it is to be noted that for commercial success in the important field of use as "bristles" in brushes, it is ordinarily desirable that the alternating increases and decreases in diameter along the filament be substantially symmetrical with respect to intervening maximum- and minimum-points so that, when the filament is cut at maximum- and minimum-points, the resulting individual lengths or "bristles" will all be identical in length and in shape; those formed during increase in diameter of the filament and those formed during decrease will be substantially indistinguishable. Filament meeting this practical requirement is herein referred to as symmetrically tapered.

The invention will be described in detail primarily with reference to the cutting of symmetrically tapered filament and with reference to the more usual practice of cutting it at successive maximum-points, but it will be made clear that the invention is not restricted in either of these respects.

It is an object of the present invention to provide a means of cutting tapered filament accurately into unit lengths. More particularly, it is an object to provide for the accurate cutting of such filament at points of maximum or of minimum diameter. It is further an object of the invention to provide means of cutting accurately, at successive points of maximum or minimum diameter, or any other predetermined diameter, a filament in which the successive unit lengths exhibit minor variations.

It is further an object of the invention to provide, for the accomplishment of these purposes, apparatus which is readily adjusted to the requirements of filaments of various nominal unit lengths, and which, when so adjusted, will function continuously without attention, adjusting itself automatically to minor variations in unit lengths. Other objects of the invention will be apparent from the description given hereinafter.

The above objects are accomplished according to the present invention by delivering tapered filament to a cutting mechanism and varying the relation between the linear rate of delivery of the filament to the cutting mechanism and the frequency of operation of the cutting mechanism in conformity with the variation in the unit lengths of the tapered filament.

More particularly, tapered filament may be cut according to one embodiment of the apparatus of the present invention by delivering tapered filament at a constant linear speed to a cutting mechanism and varying the frequency of operation of this cutting mechanism in conformity with the interval of time between the arrival of successive maximum points of the filament at a fixed station. It lies equally within the scope of the invention, however, to maintain constant the frequency of the cutting mechanism and to vary the linear speed of delivery of the filament in the same manner, and only minor changes need be made in the apparatus to adapt it to operation under this latter system.

The apparatus for the cutting of tapered filament by the first of these alternative embodiments comprises, broadly, means of cutting, means of delivering filament at a constant linear speed to the cutting means, means of gauging the diameter of the filament passing a fixed station in advance of the cutting means, and means, actuated through this gauging means by changes in the diameter of the filament, of altering the frequency of operation of the cutting means.

More specifically, in this embodiment of the invention, the control and modification of the frequency of operation of the cutting mechanism are accomplished through the cooperation of a gauging device or "feeler" through which the passage of filament of more (or less) than a predesignated diameter actuates the closing of an electrical switch and through which the passage of filament of smaller (or larger) diameter actuates the opening of this switch, two alternative electrical circuits in parallel actuating, respectively, means of accelerating and means of decelerating the operation of the cutting means, and a commutator synchronized with the cutting means and serving to complete an electrical circuit between the above switch and, in alternation, the two parallel circuits.

It is an important feature of the invention that each period during which the switch is closed is divided, by the action of the commutator, into a subperiod of acceleration of the cutting means and a subperiod of deceleration of the cutting means, and that, when the filament is of exactly the nominal unit length for which the mechanism has been set, this division takes place at the midpoint of the period, so that the subperiods of acceleration and deceleration are equal. There is then no net change effected in the time elapsing between successive cuts.

Conveniently, but not necessarily, this coordination of the mechanism is achieved by so synchronizing the commutator and the cutting mechanism that commutation takes place at the instant of the action of the cutting mechanism to cut the filament, and at the same time by so spacing the gauging means from the cutter that, when the filament is of exactly nominal unit length, the arrival at the feeler of a point in the filament midway in the length of filament during which the switch is closed will coincide, in time, with the arrival at the cutter of a point in the filament at which a cut is to be made.

Thus in the specific case of cutting symmetrically tapered filament at successive maximum points, with the feeler mechanism arranged to hold the switch closed during passage of filament of diameter in excess of a predesignated value, the distance between the point of cut and the point of contact, or tangency, of the gauging means with the filament will be fixed at $n$ times the nominal unit length, $n$ being a whole number. Thus, if the unit length of the filament is of exactly the nominal value, the instant of cut at a maximum-point coincides with the instant of arrival of another maximum-point, $n$ unit lengths behind at the point of tangency of the gauging means. The commutation which occurs at the instant of cut thus divides into two equal subperiods the period during which the switch is in closed position.

Accordingly, the successive accelerating and decelerating effects balance each other, and there results no change in the time between successive cuts. So long as the unit length of the filament is unchanged, successive cuts will occur at the same desired point in each unit length.

If, however, the unit length of the filament increases slightly, delaying the arrival of a maximum-point at the gauging means, the commutation takes place not at its arrival but before that instant, and the period of contact is accordingly not equally divided; instead, the subperiod of acceleration is shortened and the subperiod of deceleration is lengthened, with the result of retarding the action of the cutting means to compensate for the increase in unit length.

Conversely, a shortening of the unit length lengthens the subperiod of acceleration and shortens that of deceleration and thus hastens the action of the cutting means to compensate.

The invention will be disclosed in detail with reference to the accompanying drawings wherein:

Fig. 3 is a section on the line 3—3 of Fig. 2, in the direction of the arrows;

Fig. 4 is a section on the line 4—4 of Fig. 2, in the direction of the arrows;

Fig. 5 is a section on the line 5—5 of Fig. 2, in the direction of the arrows;

Figure 1:
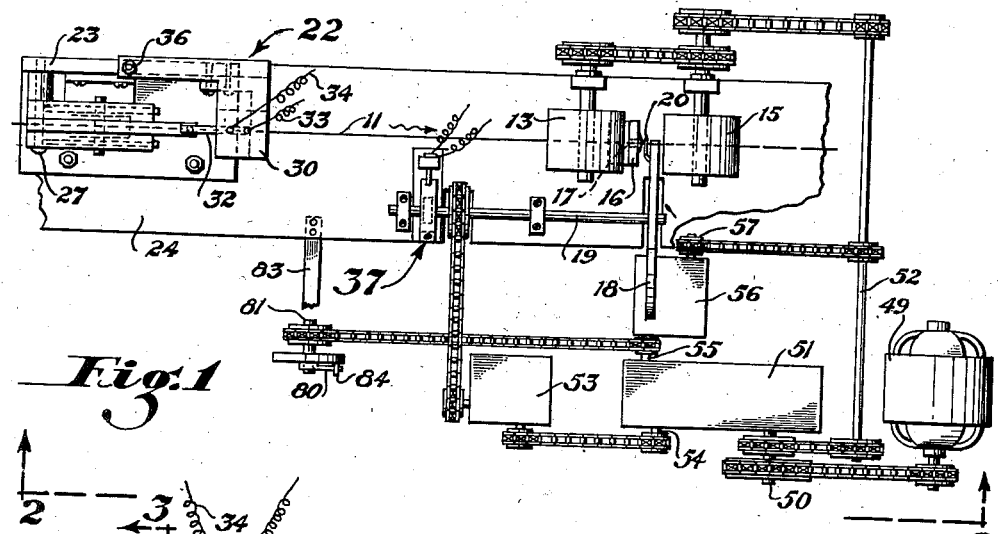
Fig. 1 is a plan view of an apparatus in accordance with a preferred specific embodiment of the invention.
Figure 2:
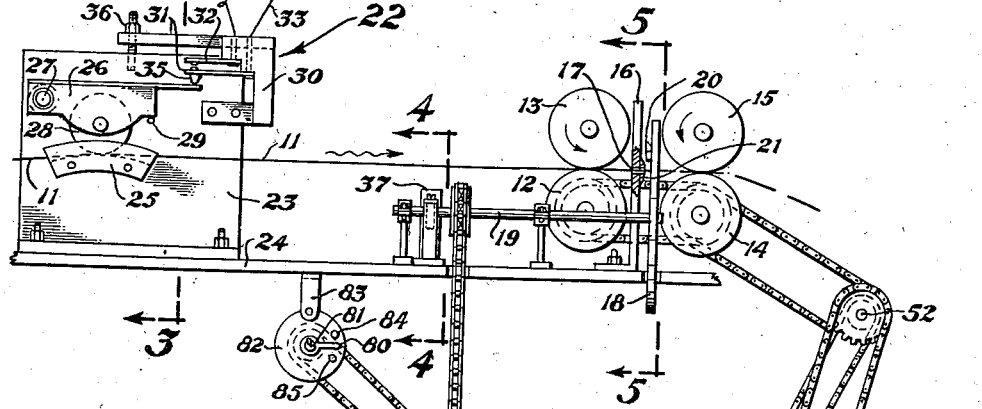
Fig. 2 is an elevation of the apparatus shown in Fig. 1, looking in the direction of the arrows 2—2 in Fig. 1.

Fig. 6 is a plan view of the compensator shown diagrammatically in Figs. 1 and 2 in its operating position by reference numeral 56; it is also a section on the line 6—6 of Fig. 7;

Fig. 7 is a section on the line 7—7 of Fig. 6;

Fig. 8 represents diagrammatically the profile of a tapered filament; and

Fig. 9 is a wiring diagram showing the electrical connections between various elements of the apparatus shown in Figs. 1 and 2.

The apparatus and its operation will now be described, with reference primarily to Figs. 1 and 2.

In a device for merely cutting equal lengths, omitting the matter of cutting a tapered filament at a predesignated point in each repetition of its profile, a filament 11, coming from the preceding operation or from a storage spool, passes between two pairs of pinch rolls, 12, 13 and 14, 15, of which the lower members 12 and 14 are driven, and the upper members 13 and 15 are idlers. Between the two pairs of pinch rolls is a plate 16 pierced by an orifice 17 which is in line with the points of tangency of the two pairs of pinch rolls 12, 13 and 14, 15. The filament 11 passes through this orifice 17.

A rotating disc 18 mounted upon a shaft 19 carries a cutting knife 20 which is so placed as to cross the line of travel of the filament 11 upon each revolution of the disc 18. This causes it to pass close to an annular boss 21 attached to the plate 16 around the orifice 17, and the shearing action between the knife 20 and the boss 21 causes the filament 11 to be cut (see Fig. 5). The cut pieces, being already in the grip of the pair of pinch rolls 14, 15, are thus carried away and deposited beyond the pinch rolls 14 and 15.

The mechanism thus far described, together with necessary drives, is all that is needed to cut continuous filament into short lengths. So long as the peripheral speed of the pinch rolls is uniform and the speed of rotation of the cutting knife also is uniform, the filament will be cut into pieces of equal length. But this simple equipment makes no provision for the cutting of tapered filament at a predesignated point in each repetition of its profile (e. g., at the point of its maximum diameter), nor for making slight variations in the lengths cut, in conformity with slight differences in length between successive units of taper. Apparatus in accordance with the present invention for accomplishing these purposes will now be described in connection with the cutting of a symmetrically tapered filament at its maximum points.

Before arriving between the pinch rolls 12 and 13, the filament 11 passes through a gauging device 22 conveniently designated a "feeler" and indicated generally by the reference numeral 22 in Figs. 1 and 2; Fig. 3 also shows this feeler. The feeler 22 comprises essentially a fixed surface in contact with which the filament passes, a rocker bearing upon the filament during its contact with the fixed surface, and means whereby the rocker arm, when forced away from the fixed surface by passage of filament of diameter greater than a predesignated value, causes the closing of an electrical circuit.

The moving parts of the feeler 22 are mounted upon a panel 23, which is attached to a table 24, which supports also certain other parts of the apparatus. Affixed to the panel 23 is a shoe 25 having a floor curved convexly toward the line of travel of the filament 11.

The path of the filament may be an uninterrupted straight line tangent to the convex surface of the shoe 25. This would be a horizontal straight line in Fig. 2. But it is preferable to bring the filament 11 up over the shoe 25 from a slightly lower level, as shown in Fig. 2. The friction created thereby is negligible and this arrangement not only insures constant contact of the filament 11 with the shoe 25 but also avoids the risk of a misalignment in the opposite sense, which would cause an unsupported filament to exert an undesirable lifting action upon the rocker 26, which is next to be described.

This rocker 26 is pivotally mounted above the shoe 25 by means of a pin or screw 27. Desirably there is mounted in this rocker a wheel 28, adapted to rotate with its lower portion upon the shoe 25. The weight of the rocker 26 and wheel 28 are sufficient to keep the latter in contact at all times with the filament 11 passing over the rigid surface of the shoe 25, and thus the motion of the rocker 26 as a lever about the fulcrum 27 is governed by the changes in thickness of the filament 11 under the wheel 28. In the preferred form of the apparatus, however, which is designed to handle a group of filaments, passing through together, contact of the wheel 28 with the portions of smaller diameter of the passing filament 11 is prevented by restriction of the downward motion of the rocker 26 by a stop 29 (see Fig. 2). This restriction allows the passage through the feeler, without restraint of any kind, of the portions of filament of smaller diameter, and thus gives opportunity for the equalization of tension among the several filaments of the group.

The floor of the shoe 25 will differ in detail in accordance with the manner in which the filament is fed across it. Viewed as in Figure 3, this floor may be flat and horizontal so that, in the absence of the stop 29, it would make contact with the wheel 28 across the full width of the latter. In this form it serves its function of providing a fixed surface of reference for the gauging, by the wheel 28, of a single filament, or of a parallel group of filaments traveling like a ribbon and all in contact with this floor; in either such case the distance to which the wheel 28 is raised from the floor of the shoe 25 is merely the maximum diameter of a single filament, and the amplitude of motion of the rocker 26 is correspondingly small, so that delicate adjustment must be made to insure that the electrical contact between members 31 and 32, hereinafter described, will occur at the desired instant.

Preferably, for handling filament in multiple, as it is ordinarily produced, the floor of the shoe 25 would be provided with a cut in it, that is, a groove of such cross-section that the filaments approaching it in phase in a flat ribbon-like group are, upon entering it, crowded together into a compact rope-like bundle. The diameter of this bundle is, of course, several times as great as that of a single filament, and the resulting multiplication of the difference in diameters at maximum- and minimum-points provides a desirably greater amplitude of motion of the rocker 26.

In order that the groove shall adequately serve its purpose of crowding the group of filaments into a compact bundle, the width of the groove will be a fraction, usually less than one half, of the product of the maximum diameter of the filament and the number of filaments in the group. For, on the assumption that the bundle is circular and that the filaments group themselves in a concentric fashion about one central filament, the fraction will be, theoretically, For 7 filaments_____ 3/7
For 19 filaments_____ 5/19
For 37 filaments_____ 7/37

(cf. Pender, "Handbook for Electrical Engineers," second edition, p. 1983).

To the panel 23 is attached a bracket 30 of insulating material, and to this are affixed two resilient electrical contact members 31 and 32, to which are attached the respective electrical leads 33 and 34. The member 31 is fitted with an insulating knob 35 which, by reason of the resilience of the member 31, remains at all times in contact with the rocker 26. The upward and downward motion of the rocker 26 effects, respectively, closing and opening of contact between the members 31 and 32. An adjusting screw 36 passing through the bracket 30 and into the panel 23 provides for adjustment of the device by changing the distance between the electrical contact members 31 and 32 in their open position. Details of this assembly are shown to best advantage in Fig. 2.

Thus the feeler device 22 provides a rigid surface 25 over which passes the filament 11, and means 26, 28, 35, 31, 32, of closing an electrical switch when the diameter of the filament passing is in excess of a predesignated value.

A second device constituting a feature of the apparatus is a commutator generally indicated by the reference numeral 37 in Figs. 1 and 2 and shown in detail in Fig. 4. This comprises alternative electrical contacts and means of opening and closing them in synchronization with the cutting action of the knife 20 upon the filament 11.

Referring particularly to Fig. 4, to a base plate 38, which is fastened to the table 24, are attached two insulating supports 39 and 40. The support 39 carries two alternative contact surfaces 41 and 42 to which are connected respective leads 43 and 44. The other insulating support 40 carries a resilient lever member 45, through which electrical current can be carried between a lead 46 and either of the contacts 41 and 42. The normal position of the member 45 is in contact with the member 41, but it can be raised, against its resilience, to break contact with 41 and make contact with the alternative member 42. This alternation of contact is effected by the action of a cam 47 rotating beneath the member 45, to which latter is attached an insulator 48 to prevent its making electrical contact with the cam 47. The cam 47 is mounted upon the shaft 19, and is accordingly synchronized with the cutting disc 18, which also is mounted upon this shaft. Figs. 1 and 2 show the position of this commutator 37 with respect to the apparatus as a whole.

The method and apparatus of the invention are based upon provision of controlled differentials of speed between the pinch rolls, 12, 13, and 14, 15, and the cutting disc 18. The whole system is driven by a motor 49, which is connected by sprockets and chain to the constant-speed shaft 50 of a variable reducing drive 51. From this shaft 50, by way of a countershaft 52, are driven the pinch rolls 14 and 12 which, therefore, rotate at constant speed. The shaft 19 is driven, by way of a right-angle drive 53, from the variable-speed shaft 54 of the variable reducing drive 51. The rate of rotation of the shaft 19 is thus subject to change through adjustment of the ratio between the speeds of the shafts 50 and 54 of the variable reducing drive 51. This ratio is controlled by the turning of a shaft 55, which actuates the ratio-control of the variable reducing drive.

The adjustment of the ratio of speed between shafts 50 and 54, which in the ordinary use of a variable reducing drive is accomplished by manual operation of a hand wheel, or by a pilot motor, is here provided by automatic operation of a reversing drive controlling the turning of the shaft 55. This reversing drive, referred to herein for convenience as a "compensator," is shown diagrammatically in its operating position in Figs. 1 and 2 at 56, and is shown in detail, on a larger scale, in Figs. 6 and 7.

The compensator 56 is driven from the countershaft 52 through a sprocket 57 which is shown in Figs. 6 and 7. The sprocket 57 is attached to the shaft 58 of the compensator 56 which constitutes its driving shaft. The shaft 55, already mentioned, is the driven shaft of the compensator 56, and the direction in which it is turned is dependent upon the operation of intermediate mechanism next described.

An intermediate shaft 59 (see Fig. 6) lying between the shafts 58 and 55 is driven by the shaft 58 by way of sprockets and chain 60, and carries one half 61a of a jaw clutch. The shaft 59 rotates in the same sense as the shaft 58. Coaxial with the shaft 59 and located near the opposite end of the shaft 58 is a similar shaft 62, which carries one half 63a of a second jaw clutch. The shaft 62 is driven from the shaft 58 by means of meshing gears 64 and 64a, and hence rotates in the opposite sense from that of shaft 59. The mating halves 61b and 63b of the respective jaw clutches are carried on the ends of a shaft 65 which is coaxial with the shafts 59 and 62 and lies between them and is of such length that it can be moved longitudinally between them so as to effect engagement of one or the other of the jaw clutches 61 and 63. Obviously, the shaft 65 must be carried in bearings which will permit its movement longitudinally but such bearings have been omitted from the drawings to permit clearer illustration of the arrangement of the various parts. Upon the shaft 65 is a gear 66 which meshes with a gear 67 carried by the shaft 55. Thus, with the shaft 58 in rotation, the engagement of the clutch 61 will cause the shaft 55 to rotate in sense opposite to that of shaft 58; engagement of the clutch 63, however, will cause the shaft 65 to rotate in the same sense as the shaft 58.

Refering to Fig. 7, a collar 68 is carried by the shaft 65 which is free to rotate within the collar 68. Rings 90 and 91 fixedly mounted on shaft 65 serve to prevent lateral movement of the collar 68 along the shaft 65. Pinned to the collar 68 on the shaft 65 is the lower end of an arm 69, of which the upper end is pinned at a fixed point in the frame of the compensator, which frame is omitted from Fig. 7 for purposes of simplification. Mounted upon this arm 69, at right angles to it, are two core-pieces 70 and 71 of magnetizable metal, and to the frame of the compensator are affixed two solenoids, 72 and 73 in such positions as to be entered by the respective core-pieces 70 and 71. The solenoid 72 has two leads 74 and 75 for connection with other parts of the apparatus, and the solenoid 73 has, similarly, leads 76 and 77.

The passage of electric current through the solenoid 73, setting up a magnetic flux to attract the core-piece 71, will cause movement of the arm 69 in the direction of the solenoid 73 and thus accomplish the engagement of the two halves 61a and 61b of the jaw clutch through which rotation of the shaft 58 will be transmitted to cause rotation of the shaft 55 in the opposite sense. This is the position of the arm 69 and the shaft 65 in the Figs. 6 and 7. Analogously, the passage of electrical current through the solenoid 72 will cause the rotation of the shaft 58 to be transmitted to rotate the shaft 55 in its own sense.

The cooperation of the feeler 22, the commutator 37 and the compensator 56 with each other is shown by the wiring diagram of Fig. 9. In Fig. 9 leads 78 and 79 represent a convenient source of current, e. g., the lighting circuit. In the circuit made up of the various elements shown in Fig. 9, current flows only when there is contact between the members 31 and 32 of the feeler 22, i. e., only when the diameter of the filament 11 passing over the shoe 25 and tangent under the wheel 28 is in excess of a predesignated value. For purposes of illustration, this selected critical value of diameter may be shown at the points A in the longitudinal cross-section of a symmetrically tapered filament represented exaggeratedly in Fig. 8.

When contact exists between 31 and 32, the current which flows will pass through one or the other of the solenoids 72 and 73, according to whether contact of the arm 45 of the commutator 37 is made through the circuit 41, 43 or through the circuit 42, 44.

The angular positions of the cutting disc 18 and the cam 47 on the shaft 19 are such that the transfer of contact in the commutator 37 from the circuit 41, 43, etc., to the circuit 42, 44, etc., by the raising action of the cam 47 upon the strip 45 takes place at the instant at which the cutting knife 20 on the cutting disc 18 severs the filament 11 emerging through the boss 21.

If the filament shown in cross-sectional form in Fig. 8 is assumed to be passing from left to right through the feeler 22, and if the latter is adjusted so as to make and hold a closed contact between members 31 and 32 when the diameter of the filament 11 passing under the wheel 28 is in excess of that at the successive points A, it will be evident that this circuit will be open during the passage of the portion of the filament between $A_1$ and $A_2$, closed during the passage of $A_2$—$A_3$, open during the passage of $A_3$—$A_4$, and so forth. It is desired that the cut be made at a maximum-point. If the distance between the point of cut at 20 and the point of tangency of the filament 11 with the wheel 28 of the feeler 22 be $n$ unit lengths (where $n$ is a whole number), then when a cut takes place at the maximum-point $M_1$, the point of tangency with the wheel 28 of the feeler 22 will be the maximum-point $n$ unit lengths away, e. g., at $M_3$.

The instant at which the cut takes place thus coincides with the instant at which the compensator acts to shift the path of the current from one solenoid to the other, e. g., from solenoid 73 to solenoid 72. This solenoid 72 remains in operation during the time it takes the filament to travel the distance between $M_3$ and $A_5$, and the resulting turning of the shaft 55 effects, during this brief time, a gradual change in the ratio of speed between the shafts 50 and 54 of the variable reducing drive and correspondingly a change (retardation) in speed of the shaft 19 which is driven from the latter. When the travel of the filament 11 through the feeler 22 carries the point $A_5$ past the point of tangency with the wheel 28, the corresponding fall of the rocker 26 breaks the contact between members 31 and 32, and current ceases to flow in the solenoid 72. At this instant of the cessation of the pull of the solenoid 72, the jaw clutch 63a, 63b automatically disengages itself, by reason of the shape of its teeth, the rotation of the shaft 55 ceases, and correspondingly the ratio of speed between the shafts 50 and 54 of the variable reducing drive ceases to change. The ratio remains unchanged until the further passage of the filament brings the point $A_6$ to the point of tangency with the wheel 28. This raises the rocker 26 and re-establishes the electrical contact. But meanwhile, at an instant corresponding to the passage past the point of tangency of the minimum-point $m_3$, i. e., one half revolution of the shaft 19 subsequent to the instant of the cut, the action of the cam 47 has allowed the contact strip 45 to break contact with the circuit 42, 44 and to establish contact with the circuit 41, 43. Accordingly now when, upon arrival of point $A_6$ at the point of tangency, current is caused to flow again, it flows this time through the other solenoid 73 and accordingly actuates a rotation of the shaft 55 to reverse the adjustment just made in the ratio of speed between shafts 50 and 54, i. e., to accelerate the speed of the shaft 19. Then upon arrival of the point $M_4$ at the point of tangency, the cycle is completed and the switch to the solenoid 72 is repeated. Thus between the instants of passage of successive maximum-points past the point of tangency, there has been a period of slowing down of the cutting disc 18 ($M_3$—$A_5$), a period of constant speed ($A_5$—$A_6$) and a period of speeding up ($A_6$—$M_4$). Since the periods $M_3$—$A_5$ and $A_6$—$M_4$ are equal, the slowing down and speeding up balance each other, and the elapsed time between successive cuts remains constant.

In other words, the period during which the switch 31, 32 is closed is divided, by the action of the commutator 37, into two subperiods, during one of which (e. g., $A_2$—$M_2$, etc.) the cutter is being accelerated and during the other of which (e. g., $M_2$—$A_3$, etc.) it is being decelerated. Under the circumstances just described, in which the actual unit length is exactly the nominal unit length for which the mechanism has been set, there occur within one revolution of the cutting disc 18 one subperiod of deceleration (e. g., $M_3$—$A_5$) and one subperiod of acceleration (e. g., $A_6$—$M_4$), and since these subperiods are equal there is no net effect upon the frequency of the cut. So long as the unit length of the filament remains constant, the time elapsing between successive cuts remains constant and each cut is made at a maximum-point as is desired.

If, however, a small change occurs in the unit length, i. e., in the distance between successive maximum-points, as may result from some inadvertent irregularity in the preceding steps of manufacture of the tapered filament, it becomes necessary to make a corresponding change in the time elapsing between the instants of successive cuts, and this change the apparatus automatically accomplishes.

Let it be assumed that the unit length has become longer. Since the linear rate of travel of the filament 11 is unchanged, it becomes necessary to reduce the rate of rotation of the cutting disc 18 in order that the distance between successive cuts shall be increased to the distance between successive points of maximum diameter.

Assume that a cut is made, as before, at a maximum-point $M_1$, but that the unit length of the subsequent filament is greater than that of what has preceded and for which the apparatus has been set. Since the distance between the point of cut at 20 and the point of tangency under the wheel 28 has not been changed, the point of tangency at the instant of this cut will be not at the point $M_3$, as before, but instead will be at a point short of this, between $A_4$ and $M_3$, such as L.

It will be remembered that heretofore during the passage of the filament from $A_4$ to $M_3$ under the feeler 22 the compensator 56 has acted to accelerate the shaft 54 of the variable reducing drive, and hence to accelerate the rotation of the cutting disc 18, and that this accelerating action has continued until the instant of the cut, which heretofore has taken place at the instant when $M_3$ is at the point of tangency. Now, however, with a greater distance between $M_2$ and $M_3$, the cut takes place before $M_3$ arrives at the point of tangency, i. e., when L is at the point of tangency. Since, however, at the instant of the cut the commutator 37 acts to reverse the adjustment of the speed of the shaft 54, it will be evident that this time the subperiod of acceleration of the shaft 54 has been reduced by an amount corresponding to the time of travel of the distance L—$M_3$. Furthermore, this same length of time which has been subtracted from the subperiod of acceleration of the shaft 54 is added to the subperiod of its retardation, which now covers the time of travel of the distance L—$A_5$ instead of $M_3$—$A_5$. This time, then, the retarding effect of the operation of the compensator is greater than the accelerating effect. Furthermore, during the period of inactivity of the compensator during the passage through the feeler 22 of the length $A_5$—$A_6$, the decreased rate of rotation of the shaft 54, resulting from the longer period of retardation, is maintained. These two factors combine to decrease the average of the rate of rotation of the shaft 54, and correspondingly to delay the next arrival of the cutting knife 20 at the point of cut, and thus to compensate for the increase in unit length of the filament.

The action of the mechanism to compensate for a decrease in the unit length of the filament by increasing the rotational speed of the cutting disc 18 is obviously the reverse of that just described.

In the ordinary course of manufacture of tapered filament, the fluctuations in the unit length of continuous tapered filament will be neither large nor abrupt, and the automatic adjustment of the speed of the cutting disc to compensate for the normal fluctuations can be set at a desirable mean between sluggishness and overcompensation by suitably selecting the magnitude of the rate of change imposed by the compensator 56 upon the ratio of speed between the two shafts 50 and 54 of the variable reducing gear 51. This magnitude is, of course, a function of the rate of rotation of the shaft 55 and of the length of time of its rotation, and correspondingly is subject to control (1) by selection of gear ratios between the shaft 52 and the shaft 55 and (2) by lengthening or shortening the period of activity of the solenoids, which corresponds to the time of travel of the length $A_2$—$A_3$ and which is therefore controllable by setting the feeler 22, by means of the adjusting screw 36, to close the electrical circuit under the actuation of a smaller or larger diameter of filament.

The apparatus of the invention is designed to compensate for minor variations in the unit length of the tapered filament and not for gross accidental changes, such as that resulting from the careless tying together of filament in such a way as to shorten drastically the distance between two successive maximum-points. For the information of the operator it is desirable to provide a simple indicator which registers at all times the performance of the compensating mechanism. This may take the form, shown in Figs. 1 and 2, of a pointer 80 keyed to a shaft 81 which is positively driven by the compensator shaft 55 and thus duplicates its rotation, either directly or, preferably, at reduced angular amplitude. Thus the successive clockwise and counterclockwise rotations of shaft 55 are indicated by clockwise and counterclockwise movements of the pointer 80. Behind the pointer 80 is a disc 82 which is fastened, by means of a clamp 83, to the table 24. This disc 82 thus does not rotate, and hence two pins 84 and 85 fastened to the face of the disc 82 and projecting beyond the plane of the pointer 80 serve as points of reference for observing the motion of the latter. These pins 84 and 85 are separated by an angular distance corresponding to about twice the normal amplitude of the oscillations of the pointer 80 corresponding to the alternating rotations of the shaft 55.

Under normal conditions of variation in unit length of filament the necessary compensation is achieved by something less than the full potential compensating effect of the mechanism, and correspondingly the pointer 80 seldom is moved to its full amplitude in either direction. When, however, a gross variation in unit length of filament is encountered (such as may result from a momentary failure or irregularity in a preceding operation, or from a splice), the mechanism, being designed only to make delicate compensation for small variations, is unable to neutralize its effect within a reasonable time. This situation is made evident by persistent contact of the pointer 80 against one of the pins 84 or 85, and some provision must be made to prevent shearing of the pin, or a break elsewhere in the mechanism, at such a time.

This protection is desirably achieved by providing an opportunity for slippage between the compensator 56 and the shaft 55 which is driven by it. To this end, the gear 67 (Figs. 6 and 7) is not keyed to the shaft 55 but drives the latter through a friction clutch mechanism. A collar 86 is fastened to the shaft 55 adjacent to the gear 67 in its operating position. Against the other face of the gear 67 a fibre disc 87 is held by a clutch plate 88 under the thrust of a spring 89 abutting against a second collar 90, which is fastened to the shaft 55 in such position as to create appropriate compression of the spring 89.

When the occurrence of a gross change in unit length of filament is evidenced by persistent contact of the pointer 80 with one of the pins 84 or 85, and by slippage of the clutch mechanism just described, the clamp 83 is released, allowing the disc 82 to accommodate itself to the thrust of the pointer 80, so that the clutch mechanism is no longer caused to slip. With the arrival now at the feeler 22 of filament of normal unit length, the compensating mechanism, freed of the restraint of the pins 84 and 85, will within a few cycles effect a restoration of the necessary coincidence of arrival of the knife 20 and a maximum-point of the filament 11 at the point of cut. Then the pointer 80 is returned to its normal operating position, and with it the disc 82, which is then clamped again into position.

It will be understood that the apparatus described above and shown in the drawings is merely illustrative and that the invention is not limited thereto. A fundamental of the specific apparatus illustrated and of the invention resides in varying the relation between the linear rate of delivery of filament to a cutting mechanism and the frequency of operation of the latter. The rate of delivery of the filament is constant and the frequency of the cutter is varied in the specific apparatus illustrated. However, it is entirely feasible to maintain constant the frequency of cutting and to vary the rate of delivery of the filament.

To do this involves simple mechanical changes in the mechanism described, e. g., driving the cutting disc 18 from the constant-speed shaft 50, driving the rolls 12, 13, 14, 15 and the commutator 37 from the variable-speed shaft 54, and interchanging the circuits of the solenoids 72 and 73 so that an increase in unit length of filament will cause a net acceleration of the shaft 54, instead of a net deceleration as in the foregoing description.

The period during which the electrical circuit is closed has been described above as embracing the time of passage through the feeler of filament of diameter above a predesignated value (e. g., $A_4$—$A_5$), and the instant of cut as occurring, normally, at the midpoint of this period. Obviously the purposes of the invention will be equally well served by having the circuit closed, instead, during the period of passage of filament of less than predesignated diameter (e. g., $A_5$—$A_6$), and having the instant of cut occur, normally, at the midpoint of that period. Simple electrical and mechanical changes in the mechanism as described enable it to function in this equivalent manner.

If it be desired to cut a symmetrically tapered filament at successive minimum-points instead of maximum-points, the change is effected by moving the feeler 22 so that the distance between its point of tangency, under the wheel 28, and the point of cut at 20 shall be $(n+\frac{1}{2})$ unit lengths. If it should be desired to make the cut elsewhere than at a maximum- or minimum-point, this could be accomplished by suitable change in the position of the feeler 22.

For purposes of simplifying the description of the invention and thereby facilitating the understanding of it, it has been stipulated in the foregoing detailed description that the filament involved is of symmetrical taper, and that the synchronization of the commutator and the cutting mechanism is such that commutation takes place at the instant of cut. But an understanding of the invention in that specific embodiment will make it evident that it is not restricted in either of these respects.

Even if the taper is not symmetrical, it will still act to raise and lower the rocker and thus to provide alternating periods in which the switch is closed and opened. In the case of non-symmetrically tapered filament, the midpoint of the period in which the switch is closed will usually not coincide with the maximum- or minimum-point. But if the feeler be so placed that the instant of tangency of this midpoint normally coincides with the instant of commutation, the desired result is obtained. Thus in this variant it is necessary merely that the feeler have been moved slightly to one side or the other of the position $n$ or $(n+\frac{1}{2})$ unit lengths from the point of cut.

Also, although it is essential that the commutation normally take place at the midpoint of the period during which the switch is closed, it is not essential that this be the same as the instant of cut. If this first requirement be met, it will be evident that, regardless of the time relationship between the instant of commutation and the instant of cut, merely an appropriate adjustment of the distance between feeler and cutter is required to insure that the cut will occur at the desired point in the unit length.

An advantage of the present invention is that it provides a practical and automatic means by which tapered filament may be accurately cut at a desired point in each successive unit length. A further advantage is that the apparatus of this invention automatically accommodates itself to minor variations in successive unit lengths of tapered filament. A still further advantage is that the present invention accurately cuts a plurality of tapered filaments simultaneously; in fact, it actually accomplishes this just as effectively, if not more effectively, than it does when only a single filament is being cut.

As many apparently widely different embodiments of this invention may be made without departing from the spirit and scope thereof, it is to be understood that the invention is not limited to the specific embodiments thereof except as defined in the appended claims.

We claim:

1. In an apparatus for cutting a tapered filament composed of a series of relatively uniform tapered sections, at a predetermined point in each of said tapered sections, the combination of means for cutting a tapered filament, means for delivering said filament to said cutting means, a gauging device comprising a rigid surface and a rocker adapter to make tangential contact with filament in contact with said surface at a fixed point in the path of said filament in advance of said cutting means, and means actuated through said gauging device by change of diameter of the filament there gauged, of controlling the relation between the linear rate of delivery of said filament and the frequency of operation of said cutting means.

2. In an apparatus for cutting a tapered filament composed of a series of relatively uniform tapered sections, at a predetermined point in each of said tapered sections, the combination of a rotating knife for cutting a tapered filament, means for delivering said filament at constant linear speed to said rotating knife, means for gauging the diameter of said filament passing a fixed station in advance of said rotating knife, and means actuated through said gauging means by change of diameter of the filament there gauged, of controlling the speed of the rotating knife and correlating said speed with the frequency of change of diameter of said filament.

3. In an apparatus for cutting a tapered filament composed of a series of relatively uniform tapered sections, at a predetermined point in each of said tapered sections, the combination of means for cutting a tapered filament, said means operating at uniform frequency, means for delivering said filament to said cutting means, means for gauging the diameter of said filament passing a fixed station in advance of said cutting means, and means actuated through said gauging means by change of diameter of the filament there gauged, of controlling the linear rate of delivery of said filament to said cutting means and correlating said rate with the frequency of change of diameter of said filament.

4. In an apparatus for cutting a tapered filament composed of a series of relatively uniform tapered sections, at a predetermined point in each of said tapered sections, the combination of means for cutting a tapered filament, means for delivering said filament to said cutting means, a gauging device comprising a fixed rigid surface and a rocker adapted to make tangential contact with filament in contact with said surface at a fixed point in the path of said filament in advance of said cutting means, an electrical switch actuated by the displacement of said rocker by a change in diameter, beyond a predesignated value, in said filament passing in contact therewith, two alternative electrical circuits, means in one of said alternative circuits of increasing the ratio between the frequency of operation of said cutitng means and the linear rate of delivery of said filament to said cutting means, means in the other of said alternative circuits of decreasing said ratio, and a commutator synchronized with said cutting means and adapted to complete an electrical circuit between said switch and, in alternation, each of said alternative circuits.

5. In an apparatus for cutting a tapered filament composed of a series of relatively uniform tapered sections, at a predetermined point in each of said tapered sections, the combination of means for cutting a tapered filament, means for delivering said filament at constant linear speed to said cutting means, a gauging device comprising a fixed rigid surface and a rocker adapted to make tangential contact with filament in contact with said surface at a fixed point in the path of said filament in advance of said cutting means, an electrical switch actuated by the displacement of said rocker by a change in diameter, beyond a predesignated value, in said filament passing in contact therewith, two alternative electrical circuits, means in one of said alternative circuits of accelerating the frequency of operation of said cutting means, means in the other of said alternative circuits of decreasing said frequency, and a commutator synchronized with said cutting means and adapted to complete an electrical circuit between said switch and, in alternation, each of said alternative circuits.

6. In an apparatus for cutting a tapered filament composed of a series of relatively uniform tapered sections, at a predetermined point in each of said tapered sections, the combination of means for cutting a tapered filament, means for delivering said filament to said cutting means, a gauging device comprising a fixed rigid surface and a rocker adapted to make tangential contact with filament in contact with said surface at a fixed point in the path of said filament in advance of said cutting means, an electrical switch actuated by the displacement of said rocker by a change in diameter, beyond a predesignated value, in said filament passing in contact therewith, two solenoids in alternative electrical circuits, a commutator synchronized with said cutting means and adapted to complete an electrical circuit between said switch and, in alternation, each of said solenoids, a variable reducing drive having a constant-speed shaft driving said means for delivering said filament to said cutting means and having a variable-speed shaft driving the said synchronized cutting means and commutator, and a reversing gear driven by said constant-speed shaft and driving the adjustment shaft of said variable reducing drive, the reverses of said gear being actuated by the alternate energizations of said solenoids.

7. In an apparatus for cutting a tapered filament composed of a series of relatively uniform tapered sections, at a predetermined point in each of said tapered sections, the combination of a rotating knife for cutting a tapered filament, a pair of pinch rolls for delivering said filament to said rotating knife, means for gauging the diameter of said filament passing a fixed station in advance of said rotating knife, and means actuated through said gauging means by change of diameter of the filament there gauged, of controlling the relation between the speed of the pinch rolls and the speed of the rotating knife.

8. In an apparatus for cutting a tapered filament composed of a series of relatively uniform tapered sections, at a predetermined point in each of said tapered sections, the combination of a rotating knife for cutting a tapered filament, a pair of pinch rolls driven at constant speed for delivering said filament to said rotating knife, means for gauging the diameter of said filament passing a fixed station in advance of said rotating knife, and means actuated through said gauging means by change of diameter of the filament there gauged, of controlling the speed of the rotating knife and correlating said speed with the frequency of change of diameter of said filament.

9. In an apparatus for cutting a tapered filament composed of a series of relatively uniform tapered sections, at a predetermined point in each of said tapered sections, the combination of a rotating knife for cutting a tapered filament, a pair of pinch rolls for delivering said filament to said rotating knife, a gauging device comprising a fixed rigid surface and a rocker adapted to make tangential contact with filament in contact with said surface at a fixed point in the path of said filament in advance of said rotating knife, an electrical switch actuated by the displacement of said rocker by a change in diameter, beyond a predesignated value, in said filament passing in contact therewith, two alternative electrical circuits, means in one of said alternative circuits of increasing the ratio between the speed of said rotating knife and the speed of said pinch rolls, means in the other of said alternative circuits of decreasing said ratio, and a commutator synchronized with said rotating knife and adapted to complete an electrical circuit between said switch and, in alternation, each of said alternative circuits.

10. In an apparatus for cutting a tapered filament composed of a series of relatively uniform tapered sections, at a predetermined point in each of said tapered sections, the combination of a rotating knife for cutting a tapered filament, a pair of pinch rolls driven at constant speed for delivering said filament to said rotating knife, a gauging device comprising a fixed rigid surface and a rocker adapted to make tangential contact with filament in contact with said surface at a fixed point in the path of said filament in advance of said rotating knife, an electrical switch actuated by the displacement of said rocker by a change in diameter, beyond a predesignated value, in said filament passing in contact therewith, two alternative electrical circuits, means in one of said alternative circuits of accelerating the speed of said rotating knife, means in the other of said alternative circuits of decreasing said speed, and a commutator synchronized with said rotating knife and adapted to complete an electrical circuit between said switch and, in alternation, each of said alternative circuits.

11. In an apparatus for cutting a group of like tapered filaments composed of a series of relatively uniform tapered sections, at a predetermined point in each of said tapered sections, the combination of means for simultaneously cutting a group of like tapered filaments, means for delivering said group of filaments to said cutting means, a gauging device positioned in the path of said group of filaments in advance of said cutting means, said gauging device comprising a fixed rigid surface provided with a groove through which said group of filaments pass, the width of said groove being less than half of the product of the maximum diameter of an individual filament and the number of filaments in said group, and a rocker adapted to make tangential contact with said group of filaments in said groove in contact with the floor thereof, and means actuated by the displacement of said rocker by a change in diameter, beyond a predesignated value, in said filaments passing in contact therewith, of controlling the relation between the linear rate of delivery of said group of filaments and the frequency of operation of said cutting means.

12. In an apparatus for cutting a group of like tapered filaments composed of a series of relatively uniform tapered sections, at a predetermined point in each of said tapered sections, the combination of means for simultaneously cutting a group of like tapered filaments, means for delivering said group of filaments to said cutting means, a gauging device positioned in the path of said group of filaments in advance of said cutting means, said gauging device comprising a fixed rigid surface convex toward the path of said group of filaments and provided with a groove through which said group of filaments pass, the width of said groove being less than half of the product of the maximum diameter of an individual filament and the number of filaments in said group, and a rocker adapted to make tangential contact with said group of filaments in said groove in contact with the floor thereof, and means restricting the approach of said rocker to the floor of said groove, and means actuated by the displacement of said rocker by a change in diameter, beyond a predesignated value, in said filaments passing in contact therewith, of controlling the relation between the linear rate of delivery of said group of filaments and the frequency of operation of said cutting means.

PAUL W. CRANE.
REUBEN T. FIELDS.